United States Patent
Bartter et al.

(10) Patent No.: US 7,991,131 B2
(45) Date of Patent: Aug. 2, 2011

(54) CONTROL OF PREPAID BALANCE STATUS NOTIFICATION

(75) Inventors: William Dale Bartter, Gahanna, OH (US); Yigang Cai, Naperville, IL (US); Werner Ulrich, Glen Ellyn, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1232 days.

(21) Appl. No.: 11/653,741

(22) Filed: Jan. 16, 2007

(65) Prior Publication Data
US 2008/0171529 A1 Jul. 17, 2008

(51) Int. Cl.
*H04M 15/00* (2006.01)
(52) U.S. Cl. ............ 379/114.2; 379/114.15; 379/114.17
(58) Field of Classification Search ............ 379/114.01, 379/114.15–114.18, 114.2, 120, 201.02; 455/405–408, 414.1, 414.3
See application file for complete search history.

(56) References Cited

U.S. PATENT DOCUMENTS

| | | | |
|---|---|---|---|
| 5,642,483 A * | 6/1997 | Topper | 709/228 |
| 7,027,799 B2 * | 4/2006 | Morin et al. | 455/408 |
| 7,177,409 B2 * | 2/2007 | Griffiths | 379/114.2 |
| 2004/0086094 A1 * | 5/2004 | Bosik et al. | 379/88.12 |
| 2004/0198316 A1 * | 10/2004 | Johnson | 455/406 |
| 2007/0260562 A1 * | 11/2007 | Hutson et al. | 705/412 |
| 2008/0037738 A1 * | 2/2008 | Nolan et al. | 379/114.15 |

* cited by examiner

*Primary Examiner* — Quoc D Tran
(74) *Attorney, Agent, or Firm* — Werner Ulrich

(57) ABSTRACT

This invention relates to an enhanced method and apparatus for providing notification to a telecommunications customer using prepaid service that his/her prepaid balance is below a pre-specified threshold. The number of notifications is limited to a specified number within a specified interval. Advantageously, the customer is spared the nuisance o receiving multiple notifications when he/she is already aware of the problem.

20 Claims, 4 Drawing Sheets

US 7,991,131 B2

CONTROL OF PREPAID BALANCE STATUS NOTIFICATION

TECHNICAL FIELD

This invention relates to an enhanced method and apparatus for notifying prepaid telecommunications customers that their balance is below a threshold or is actually zero or negative.

BACKGROUND OF THE INVENTION

Many telecommunications customers choose to pay for their service through the establishment of a prepaid service account. This account maintains a balance of the amount of telecommunications services either in units or in dollars that a customer has in his/her account and can use for telecommunications services. In general, the account can be replenished via a call in which the customer supplies a credit or debit card number and the amount to be added to his/her account or the account can be replenished through the use of "scratch" cards purchased from vendors and communicated by the customer to the telecommunications service provider. Some retailers also provide a service whereby the customer pays a retailer and the retailer purchases telecommunications services provider for the customer. Scratch cards or retailer purchased services offer the possibility of promotions wherein the balance added to a customer's account exceeds the amount that the customer pays to the scratch card vendor or the retailer. Some customers use a service wherein they provide a credit or debit card number to the service provider and the service provider automatically replenishes the account when the account goes below a threshold.

However, many customers prefer to have a more active role in controlling their accounts. For these latter customers, provisions are made to notify them through a voice or data message that their account is below some threshold so that they can arrange to add to their account before service is denied.

A problem of the prior art is that after a customer's balance goes below a threshold, the notification systems cause a notification message to be sent to the customer on every call. If the calls are short message service (SMS) calls, these frequent notifications can become annoying to the customer and can lead to complaints to the service provider; these complaints are very expensive to process.

SUMMARY OF THE INVENTION

The above problem is solved and a contribution is made over the prior art in accordance with this invention wherein a number of notifications and the timing of these notifications are controlled by a notification class of service for prepaid service customers. Customers may specify that no more than N notifications, wherein N is generally in the range of 1-3, are to be supplied per interval, wherein an interval is typically is typically one day. Different rules are available for notification that a customer's balance is zero or negative with a warning that service is about to be cut off.

In accordance with one feature of Applicants' invention, notification messages can be sent to the customer at every opportunity (e.g., on every call) unless the customer provides a notification acknowledgement indication to the service provider. If the acknowledgement indication includes a personal identification number (PIN), then users other than the main user (for example, the children of the main user) will not be able to suppress further notifications. Advantageously, this arrangement ensures that the customer has heard the notification message without pestering the customer further.

In accordance with another feature of Applicants' invention, both the service provider and the customer can change the notification class of service so that if, for example, a customer finds that two notifications in each period are inadequate the customer can increase this number.

In accordance with another feature of Applicants' invention, the vendor of prepaid service can provide one or more pre-packaged notification classes of service, and use the choice to promote the vendor's service. Advantageously, customers can be spared the complexities of initializing their own class of service or having a vendor service representative perform this function.

In accordance with another feature of Applicants' invention, when money is automatically withdrawn from a customer's credit or debit card account because the balance has gone below a threshold for that customer, the customer receives a notification.

DETAILED DESCRIPTION

Figure 1:
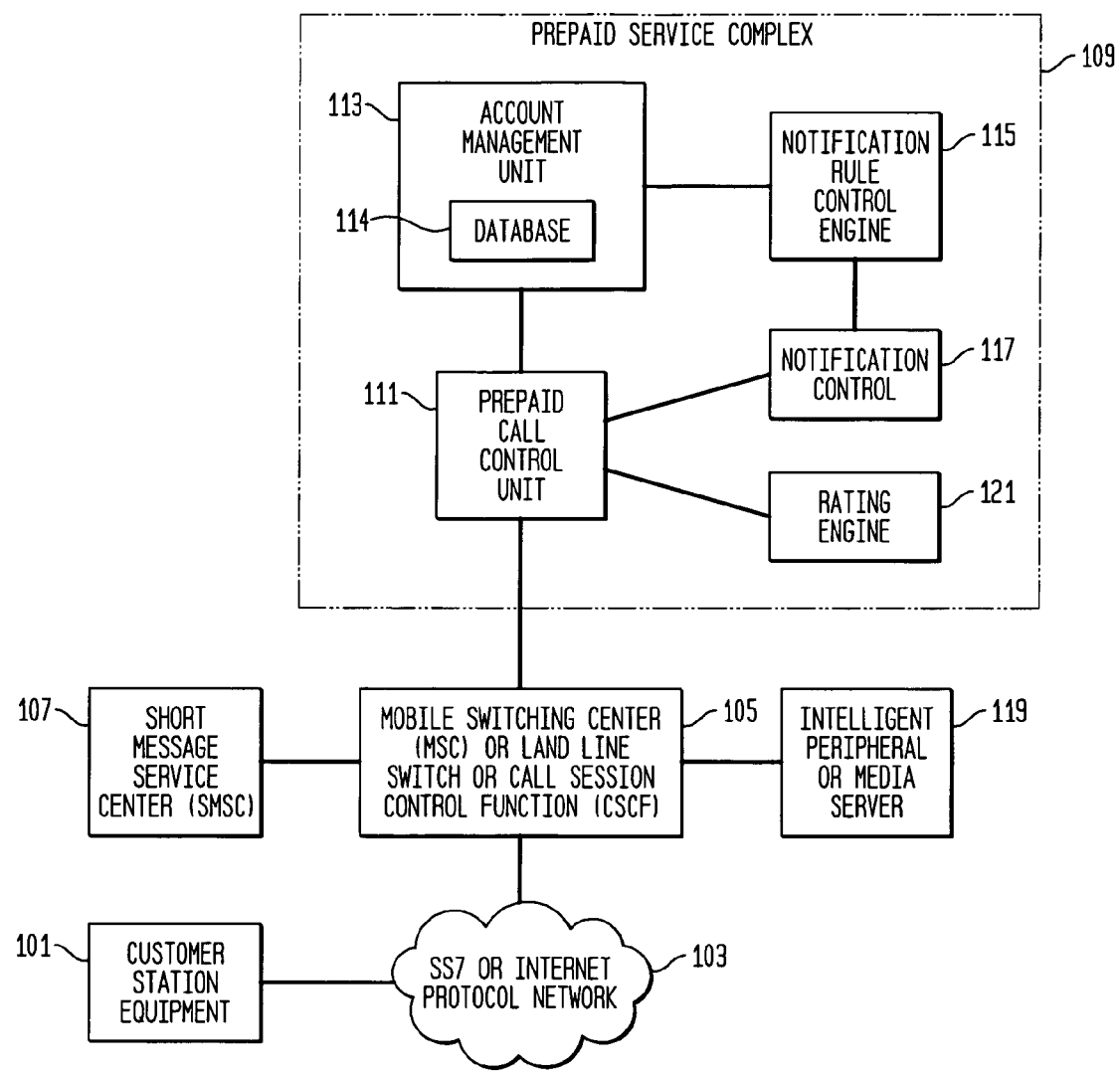
FIG. 1 is a block diagram illustrating the operation of Applicants' invention.

FIG. 1 is a block diagram illustrating the operation of Applicants' invention. A customer station 101 accesses a switch arrangement 105 via an SS7 or internet protocol (IP) network 103. The switch can be a land line switch, a mobile switching center (MSC), or simply a call session control function (CSCF) for steering data packets or data messages in accordance with the requirements of specific calls, such as in Internet Protocol (IP) Multimedia Subsystem (IMS). If the call is recognized to be a short message call, as indicated by signals originating in a cellular station 101, then the call is routed to a short message service center (SMSC) 107. The switch or SMSC access the prepaid service complex 109 in order to arrange that the customer be charged for the call by having his/her account debited by the amount of the charges for the call. The switch 105 or SMSC 107 access a prepaid call control unit 111 in the prepaid service complex 109. The prepaid call control unit communicates with an account management unit 113 which administers the customer's account, stores the notification database for the customer, and decrements the account in accordance with the charges for the call. The prepaid call control accesses the rating engine 121 in order to find out how much the account should be debited for the call itself and for each minute or other interval of the call. The prepaid call control unit communicates with the account management unit 113 to cause the account management unit to decrement the customer's account for the call and its time increments. The account management unit then calls on a notification control rule engine 115 when the customer's account goes below a threshold indicating that notification action may be required. The notification control rule engine then calls on notification control 117 to cause a notification to be sent to the customer from an intelligent peripheral (IP) or media server 119 which communicates with a customer via switch 105 and network 103. The protocol will depend on networks, call types (voice, data, text messages (SMS, Instant Message, Email)), handset types.

Each of the blocks of the prepaid service complex comprises a software package operating under the control of a processor platform. Some physical processor platforms may control several of the blocks. One of the blocks, the account management unit in the preferred embodiment, includes a database 114 which stores the notification class of service of the customers having the flexible notification feature and served by the prepaid service complex.

Figure 2:
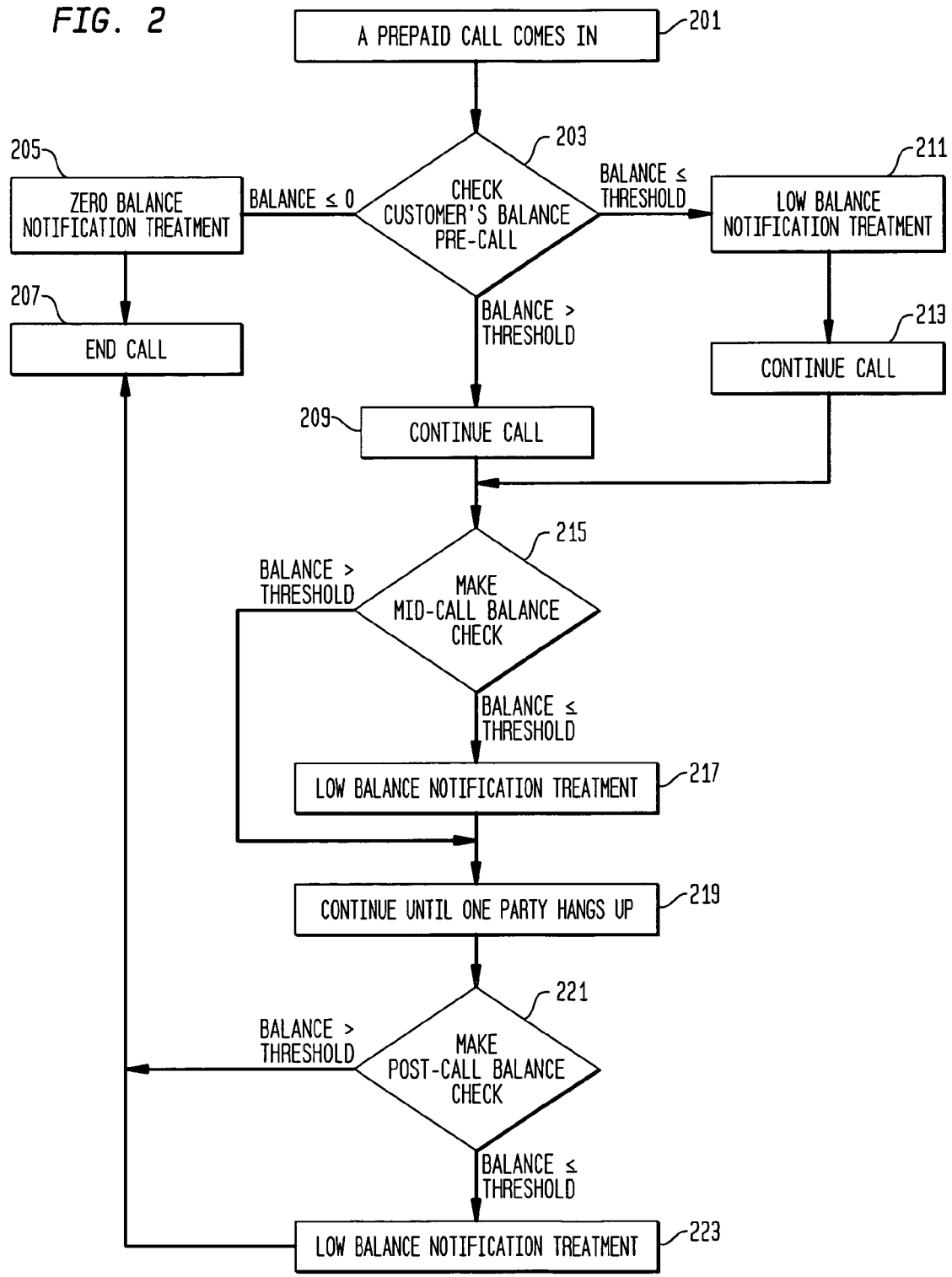
FIG. 2 is a flow diagram illustrating the application of low or zero balance notification messages.

FIG. 2 illustrates the notification process. A prepaid call comes in (action block 201). This can be either an outgoing-call from station 101 or, in the case of a cellular station 101, an incoming call. Test 203 is used to determine whether pre-call notification treatment may be required by checking the balance (test 203). If the balance is zero, then the zero balance notification treatment is invoked (action block 205) and the call is terminated (action block 207). If the pre-call balance check of test 203 indicates a balance above the threshold, then the call is allowed to continue without any balance notification (action block 209). If the pre-call balance check test 203 indicates that the balance is equal to or below threshold, then a low balance notification treatment (action block 211) is invoked. The details of the low balance notification treatment 211 and the zero balance notification treatment 205 are presented in FIG. 3.

Following the execution of the low balance notification treatment, the call continues (action block 213).

In mid-call, at intervals specified by the rating engine and the account management system, the customer's balance is checked (test 215). If the balance is now zero, then the zero balance notification treatment (action block 205) is invoked. If the balance is now at or below threshold, then the low balance notification treatment is invoked (action block 217). If the balance is above threshold, then the call is allowed to continue until one party hangs up (action block 219). Test 215 may be invoked several times during the call as specified by the rating engine and the account management system.

When one of the parties hangs up (action block 219), then test 221 is used once more to determine whether notification treatment is required in this post-call situation. If the balance is now zero, then the zero balance notification treatment 205 is invoked. If the balance is at or below threshold, then low balance notification treatment is invoked (action block 223). If the balance is above threshold, then the call is simply terminated without further notification action (action block 207).

The notification class of service can be tailored to the individual customer or may be one of a plurality of classes offered by a vendor.

Figure 3:
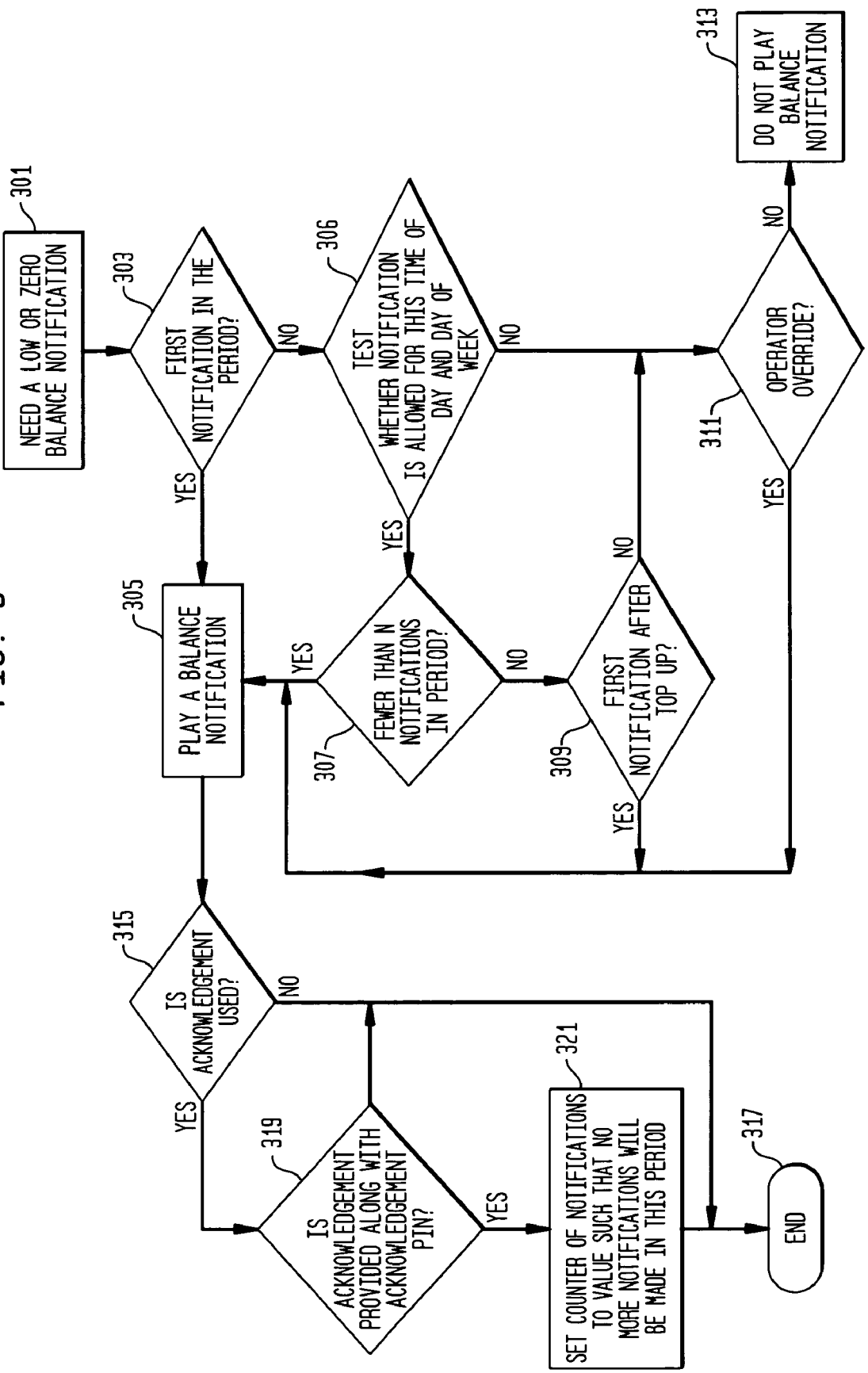
FIG. 3 illustrates the operations carried out when a low or zero balance notification treatment is requested.

FIG. 3 is a flow diagram illustrating the application of low or zero balance notification. The test of whether the notification is to be applied is the same for a low or zero balance notification except that different counters are used to determine whether a low balance notification should be sent or whether a zero balance notification should be sent. A need for a low or zero balance notification has been detected (action block 301) in one of a number of places (205, 211, 217, 223) the flow diagram of FIG. 2. Test 303 is used to determine whether this is the first notification request in the period of the notification interval. This period is typically a day. Associated with the interval is a maximum number of notifications which should be provided to the customer during that interval. If this is the first notification treatment request during the period then, in the preferred mode, a balance notification is sent to the customer (action block 305). If this is not the first notification treatment request, test 306 is used to determine whether there are time of day or day of week restrictions; if such restrictions exist as part of the notification class of service, and if the present day and time is on the restricted list, no notification will be sent. In alternate embodiments, the time and day restriction can be applied to the first notification also. Time of day and day of week restrictions can be used to decrease notification traffic during busy hours. Subsequently, test 307 is used to determine whether fewer than N notifications have been transmitted in this period. If that is the case, then a balance notification message is sent to the customer (action block 305). If N notifications had already been sent, then test 309 is used to determine if this is the first request for a notification following a top up. This would occur if the customer topped up his/her account but made so many calls following this top up that the balance is again low. If that is the case, then the counter should be reset and a balance notification should be sent (action block 305). If this is not the first request following a top up, a check is made (test 311) whether an operator override has been received requesting that a balance notification be sent even if N notifications had already been sent. If that is the case, then a balance notification message is sent. If there is no operator override, then this is a situation (action block 313) in which no balance notification is to be sent at this point.

Following action block 305 (the playing of a balance notification), test 315 is used to ask whether acknowledgement is used for balance notifications to this customer. If the customer does not have this feature, then this is the end of the process of responding to the need for a balance notification. If the customer has the acknowledgement feature, then test 319 is used to determine if the customer has provided an acknowledgement along with a personal identification number (PIN). If the customer has not provided an acknowledgement, then this is the end of the notification procedure. If the customer has provided an acknowledgement, then the counter of notifications is set to exceed the maximum number N so that no further notifications will be sent to the customer (action block 321).

The type of notification is also part of the notification class of service. For ordinary handsets, an oral notification may be preferred. For fancier handsets, a message may be preferred. For data terminals, a message, possibly accompanied by an audible signal (e.g., a bell) may be preferred.

Figure 4:
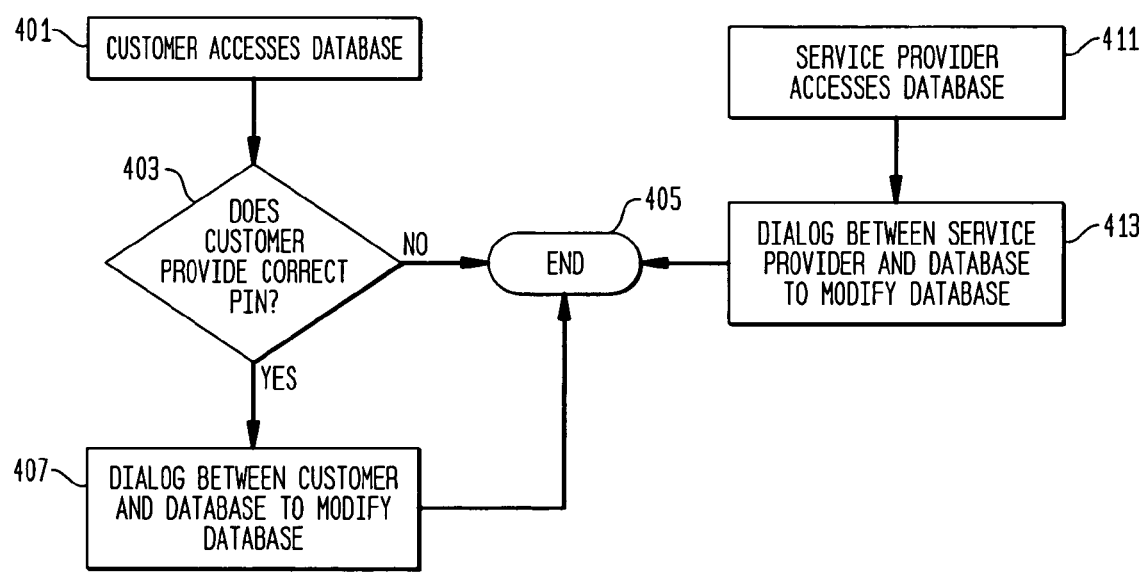
FIG. 4 is a flow diagram illustrating the modification of the customer's class of service in the notification database.

FIG. 4 illustrates the process of accessing the notification database by either the customer or the service provider. The customer accesses the database (action block 401). Test 403 is used to determine whether the customer provides a correct personal identification number (PIN). If the customer does provide a correct PIN then a dialog is allowed between the customer and the database to modify the database. Following either the modification of the database or the failure of the customer to provide a correct PIN, the process is ended (end block 405). If the service provider accesses the database (action block 411), then a dialog takes between the service provider and the database to modify the database (action block 413): Following the completion of action block 413, end block 405 is entered.

The notification database contains fields for the following:
1. threshold for notification
2. interval for providing N notifications
3. N the number of notifications to be provided during that interval
4. M the number of zero balance notifications to be provided during the interval
5. Is the customer provided with the acknowledgement feature?
6. PIN for the acknowledgement feature 7. PIN for modifying the database
8. Time of day and day of week restrictions
9. Type of notification to be used (e.g., oral, data message, data message plus audible signal)
10. Identification of vendor of prepaid service.

The data in the notification database supports the various features described above.

The above description is of one preferred embodiment of Applicants' invention.

We claim:

1. A method of notifying a customer of a status of the customer's prepaid telecommunications account, comprising the steps of:
   storing a notification database for said customer, said database comprising a limit of a number of low balance notifications to be provided to said customer during a specified interval;
   if, before, during, or after said customer makes a call, a prepaid balance for said customer is below a pre-specified threshold and fewer than N notifications have been provided to said customer during said interval, providing a low balance notification to said customer.

2. The method of claim 1 wherein said parameter N is stored in said notification database of said customer.

3. The method of claim 1 wherein said interval is specified in said notification database of said customer.

4. The method of claim 1 wherein low balance notifications are allowed only after a call.

5. The method of claim 1 further comprising the step of:
   providing a zero or negative balance notification to said customer if said prepaid balance goes to zero or negative.

6. The method of claim 5 wherein said zero or negative balance notification is provided even if N notifications had previously been provided.

7. The method of claim 1 further comprising the steps of:
   testing whether said customer can return an acknowledgment message to said low balance notification; and
   stopping further low balance notifications if said customer returns an acknowledgment message.

8. The method of claim 1 further comprising the step of:
   said customer accessing said database to modify its contents.

9. The method of claim 1 wherein a notification message can be suppressed during specified hours and/or days of the week.

10. The method of claim 1 wherein a type of said notification is stored in said notification database and said notification conforms to said type.

11. The method of claim 1 wherein the notification database for said customer comprises one of a plurality of one or more notification data sets of a vendor of prepaid service of said customer.

12. Apparatus for notifying a customer of a status of the customer's prepaid telecommunications account, comprising:
   a notification database for said customer, said database comprising a limit of a number of low balance notifications to be provided to said customer during a specified interval;
   means for detecting that said customer's prepaid balance is at or below a pre-specified threshold;
   means, responsive to detecting that said customer's prepaid balance is at or below said threshold, and that fewer than N notifications having been provided to said customer, for providing a low balance notification to said customer before, during or after said customer makes a call.

13. The apparatus of claim 12 wherein a value of N is stored in said notification database of said customer.

14. The apparatus of claim 12 wherein low balance notifications are allowed only after a call.

15. The apparatus of claim 12 further comprising means for providing a zero or negative balance notification to said customer if said prepaid balance goes to zero or negative.

16. The apparatus of claim 12 further comprising:
   means for testing whether said customer can return an acknowledgment message to said low balance notification; and
   stopping further low balance notifications if said customer returns an acknowledgment message.

17. The apparatus of claim 12 further comprising means for permitting said customer to access said database to modify its contents.

18. The apparatus of claim 12 wherein a notification message can be suppressed during specified hours and/or days of the week.

19. The apparatus of claim 12 wherein a type of said notification is stored in said notification database and said notification conforms to said type.

20. The apparatus of claim 12 wherein the notification database for said customer comprises one of a plurality of one or more notification data sets of a vendor of prepaid service of said customer.

* * * * *